United States Patent
Schafer (12)

(10) Patent No.: US 6,871,485 B2
(45) Date of Patent: Mar. 29, 2005

(54) TREE CUTTING ATTACHMENT FOR SKID LOADER

(75) Inventor: William C. Schafer, Hector, MN (US)

(73) Assignee: Loftness Specialized Equipment, Inc., Hector, MN (US)

( * ) Notice: Subject to any disclaimer, the term of this patent is extended or adjusted under 35 U.S.C. 154(b) by 0 days.

(21) Appl. No.: 10/454,144

(22) Filed: Jun. 4, 2003

(65) Prior Publication Data

US 2004/0244350 A1 Dec. 9, 2004

(51) Int. Cl.$^7$ ............................................. A01D 34/53
(52) U.S. Cl. ..................................... 56/249; 241/186.3
(58) Field of Search ..................... 56/249, 294, 504, 56/DIG. 12, 252, 156; 144/34.1, 4.1, 334, 335, 336; 241/193, 194

(56) References Cited

U.S. PATENT DOCUMENTS

| | | | |
|---|---|---|---|
| 1,312,450 A | | 8/1919 | McKoy et al. |
| 4,259,834 A | * | 4/1981 | Lambert et al. .............. 56/504 |
| 4,355,670 A | | 10/1982 | Ohrberg et al. |
| 4,878,713 A | | 11/1989 | Zanetis |
| 4,905,460 A | * | 3/1990 | Toman ........................ 56/12.7 |
| 5,003,759 A | * | 4/1991 | Brown ......................... 56/249 |
| 5,005,344 A | | 4/1991 | McCracken |
| 5,060,732 A | | 10/1991 | Baskett |
| 5,435,117 A | | 7/1995 | Eggena |
| 5,472,147 A | * | 12/1995 | Doppstadt ................... 241/88.4 |
| 5,480,351 A | * | 1/1996 | Coleman ...................... 460/72 |
| 5,495,987 A | | 3/1996 | Slaby |
| 5,499,771 A | | 3/1996 | Esposito et al. |
| 5,505,268 A | | 4/1996 | McPherson et al. |
| 5,666,794 A | | 9/1997 | Vought et al. |
| 5,706,638 A | | 1/1998 | Kinder et al. |
| 6,116,699 A | | 9/2000 | Kaczmarski et al. |
| 6,138,444 A | | 10/2000 | Torras, Sr. |
| 6,227,469 B1 | * | 5/2001 | Daniels et al. ............ 241/186.3 |
| 6,321,518 B1 | * | 11/2001 | O'Hagan ...................... 56/294 |

FOREIGN PATENT DOCUMENTS

WO    WO 01/93659 A1 * 12/2001    ......... A01D/34/535

* cited by examiner

Primary Examiner—Árpád Fábián Kovács
(74) Attorney, Agent, or Firm—Thomas J. Nikolai; Nikolai & Mersereau, P.A.

(57) ABSTRACT

A tree cutting attachment for a skid loader or other types of self-propelled work vehicles to be used at construction and landscaping sites. The device is used to cut down brush and trees of up to 8–10 inches in diameter. The tree cutting attachment is made up of a motor driven rotor assembly which is journaled within the frame of the attachment. The rotor assembly comprises a cage-like mounting system having pockets in which tempered steel blades, approximately 6 inches in width are bolted in a side-by-side relation. Two rows of blades are mounted 180 degrees apart proximate the periphery of a rotor comprised of a series of parallel, generally circular plates that are welded to longitudinally extending rods. The knife blade elements are bolted to the blade holders with the non-sharpened end of the blade elements abutting a flat steel bar that forms part of the cage.

14 Claims, 5 Drawing Sheets

TREE CUTTING ATTACHMENT FOR SKID LOADER

BACKGROUND OF THE INVENTION

I. Field of the Invention

This invention relates generally to a tree cutting machine, and more particularly to a tree cutting machine which serves as an attachment for a skid loader.

II. Discussion of the Prior Art

Clearing areas of brush and trees in an efficient and effective manner has long been a challenge to construction and landscaping workers. A machine capable of performing these tasks would be a valuable tool for difficult and challenging development jobs.

In response to this need, several rotary cutting attachments that could be used on vehicles were devised. One such device is disclosed in U.S. Pat. No. 4,355,670. This device comprises a large diesel truck with a tree felling attachment drum and assembly driven by a hydraulic motor. Its attached cutting assembly has a unique drum construction. The drum's complex mounting structure, fragmenting elements, cutting means, teeth etc. make this an original invention, vastly different in operation from the present invention. U.S. Pat. No. 5,499,771 is a related design comprising a tree cutting attachment which cuts, clips, and mulches trees with a set of cutting teeth. This varies from the present invention that implements a shaving technique. Another, closely related, prior art design is U.S. Pat. No. 1,312,450. This machine discloses disintegration of a tree stumps using a rotary attachment but operates as a large and complex group of belts, gears, and levers.

To enable the present invention to be most widely used, it was designed to attach to a skid steer vehicle. Skid steer vehicles are compact, highly maneuverable vehicles which are controlled by an operator seated within the operator compartment by actuating a pair of steering levers. Attachments, such as an auger, grapple, sweeper, landscape rake, snow blower or backhoe, some of which may include a hydraulic motor, are sometimes mounted to a boom assembly on the front of the skid steer loader. An auxiliary hydraulic system is used to control the flow of hydraulic fluid between the skid steer vehicle auxiliary hydraulic pump and the hydraulic motor on the front mounted attachment. This actuates hydraulic cylinders that position the front mounted attachments.

Various designs have been made with respect to attachments for skid-steer vehicles including those disclosed in U.S. Pat. Nos. 5,666,794 and 4,878,713. These devices mount to a skid-steer vehicle but are designed to be a flail mower and pavement planing machine, respectively, and do not perform needed tree cutting and brush clearing functions.

Therefore, what is needed is the tree cutting machine of the present invention which effectively allows for easy and efficient tree and brush clearing with an improved rotary cutting design over past inventions.

SUMMARY OF THE INVENTION

The present invention provides for a tree cutting attachment for use with a skid loader or other type of self-propelled work vehicle at construction and landscaping sites. The tree cutting attachment comprises a motor driven rotor assembly journaled within the frame of the attachment. The rotor assembly comprises a cage-like mounting system having a plurality of pockets in which tempered steel blades are bolted in a side-by-side relation. Two rows of blades are mounted 180 degrees apart proximate the periphery of the rotor. The rotor also includes a series of parallel, generally circular plates that are welded to longitudinally extending rods. Located between adjacent ones of the plates are blade holders. The knife blade elements are bolted to the blade holders with the non-sharpened end of the blade abutting a flat steel bar that forms part of the cage. The blade elements are affixed to the blade holders such that a gap between the blades' cutting edges and an elongated shear bar can be set to define a desired depth-of-cut. The shear bar is adjustably affixed to the frame in which the rotor is mounted.

The invention includes a deflector assembly joined to the frame. It carries a plurality or short lengths of chain across the front of the device. It functions to prevent debris from projecting forward when cutting brush. The present invention also includes a pusher member made up of a framework of bars which cause cut trees to fall forward when they are severed.

These and other objects, features, and advantages of the present invention will become readily apparent to those skilled in the art through a review of the following detailed description in conjunction with the claims and accompanying drawings in which like numerals in several views refer to the same corresponding parts.

DESCRIPTION OF THE PREFERRED EMBODIMENT

The present invention represents broadly applicable improvements for tree cutting attachments. The embodiments herein are intended to be taken as representative of those in which the invention may be incorporated and are not intended to be limiting.

Figure 1:
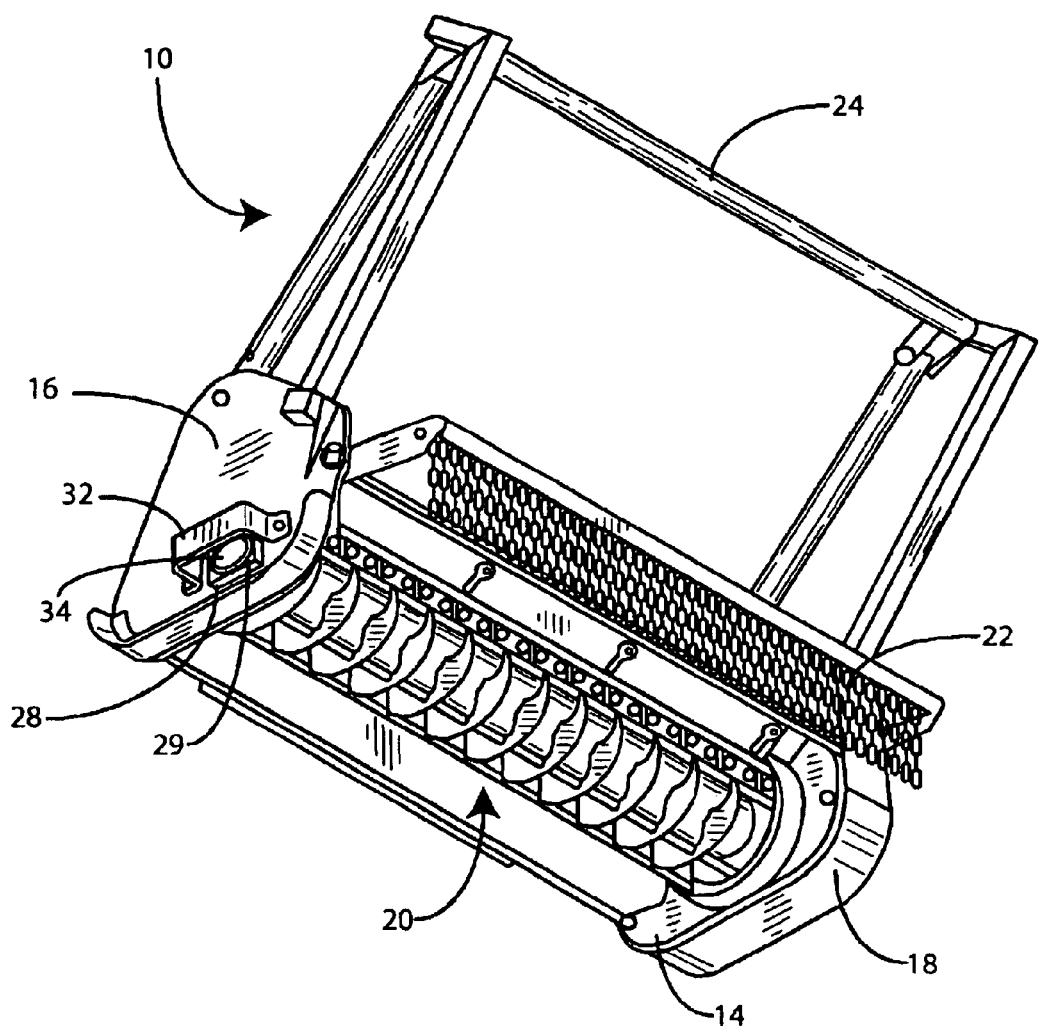
FIG. 1 is a perspective view of the front and right sides of the tree cutting attachment of the present invention.

Referring first to FIG. 1, there is shown a perspective view of the front and left sides of the tree cutting attachment for a skid loader or other type of self-propelled work vehicle. The assembly itself is indicated generally by numeral 10. It includes a housing or shroud 12, left side panel 14, right side panel 16, pulley cover 18, rotor assembly 20, chain deflector 22, and pusher member 24.

Figure 2:
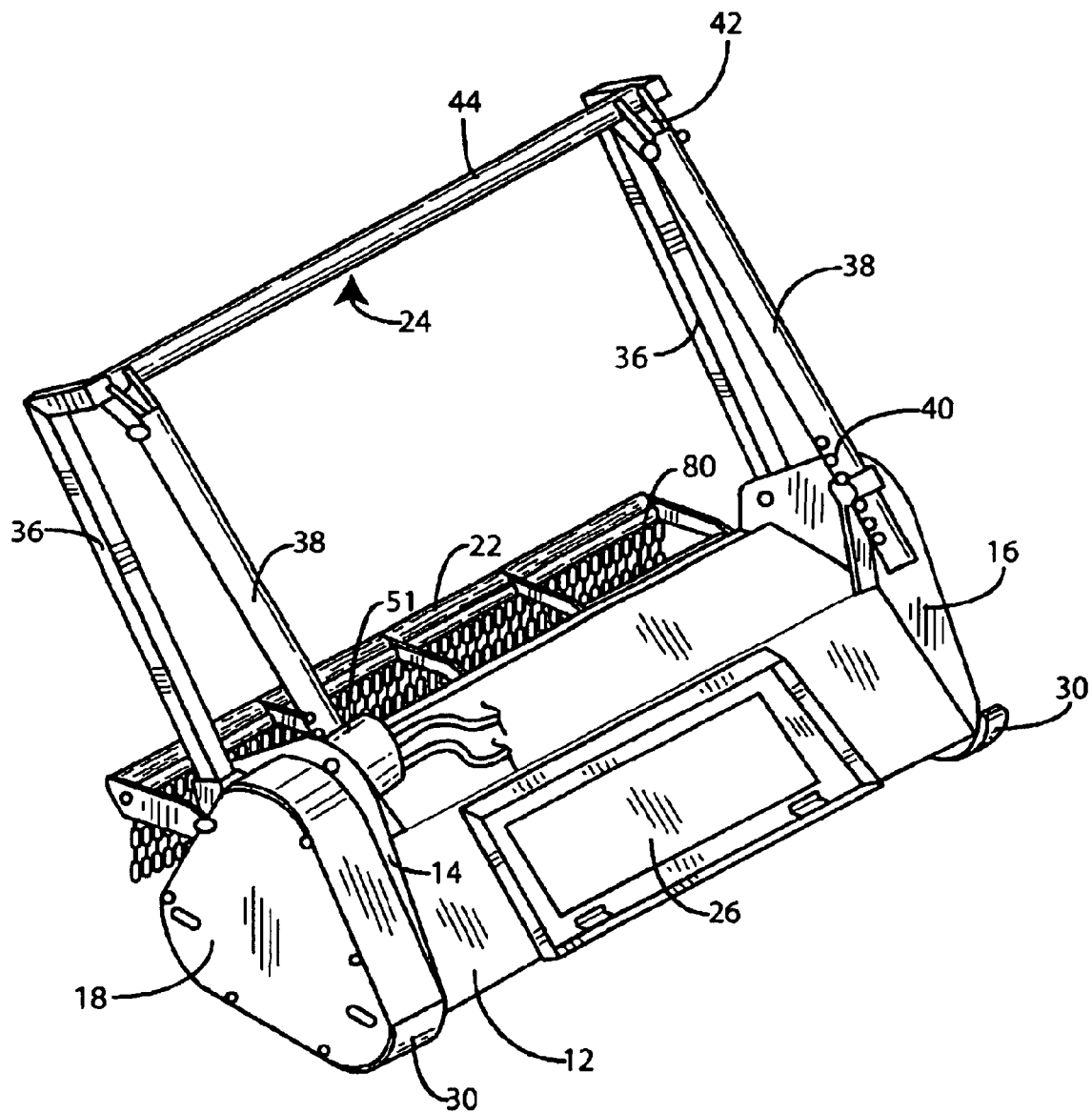
FIG. 2 is a perspective view of the back and left sides of the tree cutting attachment of the present invention.

With reference to FIG. 2, the tree cutting attachment is seen in a perspective view of the rear and left sides. The housing or shroud 12 shown is basically a piece of sheet metal bent into, roughly, a wedge-like shape, open on the front and bottom sides. On the rear side of the housing is the skid loader quick-attachment mount 26. The skid loader mount 26 pivotally mounts to the lift arms of a skid loader, as is well known in the art. Those skilled in the art will recognize that other types of quick attach mounts can be used to couple the tree/brush cutter to work vehicles other than skid loaders.

On the sides of shroud 12 are left end panel 14, and right end panel 16. These are four-sided pieces of sheet metal with rounded corners. These panels contain several holes around their perimeters for attachment to the shroud 12, as well as a large hole 28 near the bottom center of the panels containing bearings 29 for journaling the rotor assembly. (See FIG. 1.) Both left and right panels 14 and 16 have a U-shaped metal skid 30 protruding in a perpendicular direction from side surface at a lower edge thereof The left panel has a triangular-shaped cover 18 placed over it. This cover shields the elements contained beneath it. Mounted on the panel 16 is a shield bracket 32, which juts out and around the bearings 29 and the rotor shaft 34 journaled therein.

Also shown in FIG. 2 is pusher member 24. Pusher member 24 is a safety structure, which is designed to push against the trunk of a tree as it is being cut and prevents it from falling onto the cab of the skid vehicle. The pusher member 24 has two pairs of legs pivotally mounted to left and right panels 14 and 16. The front most two legs 36 are rigid, L-shaped members. A crossbar 44 of the pusher member 24 extends between the rearmost two legs 38 which are straight, metal bars, preferably of square-shape cross section. There are several holes 40 in the lower end of the bars 38 allowing adjustment of the angle at which the pusher projects from the cutting assembly. The top ends of the rearmost legs 38 are pivotally engaged with small linking pieces 42. These linking pieces attach near the ends of pusher member bar 44 as best seen in FIG. 2.

Figure 3:
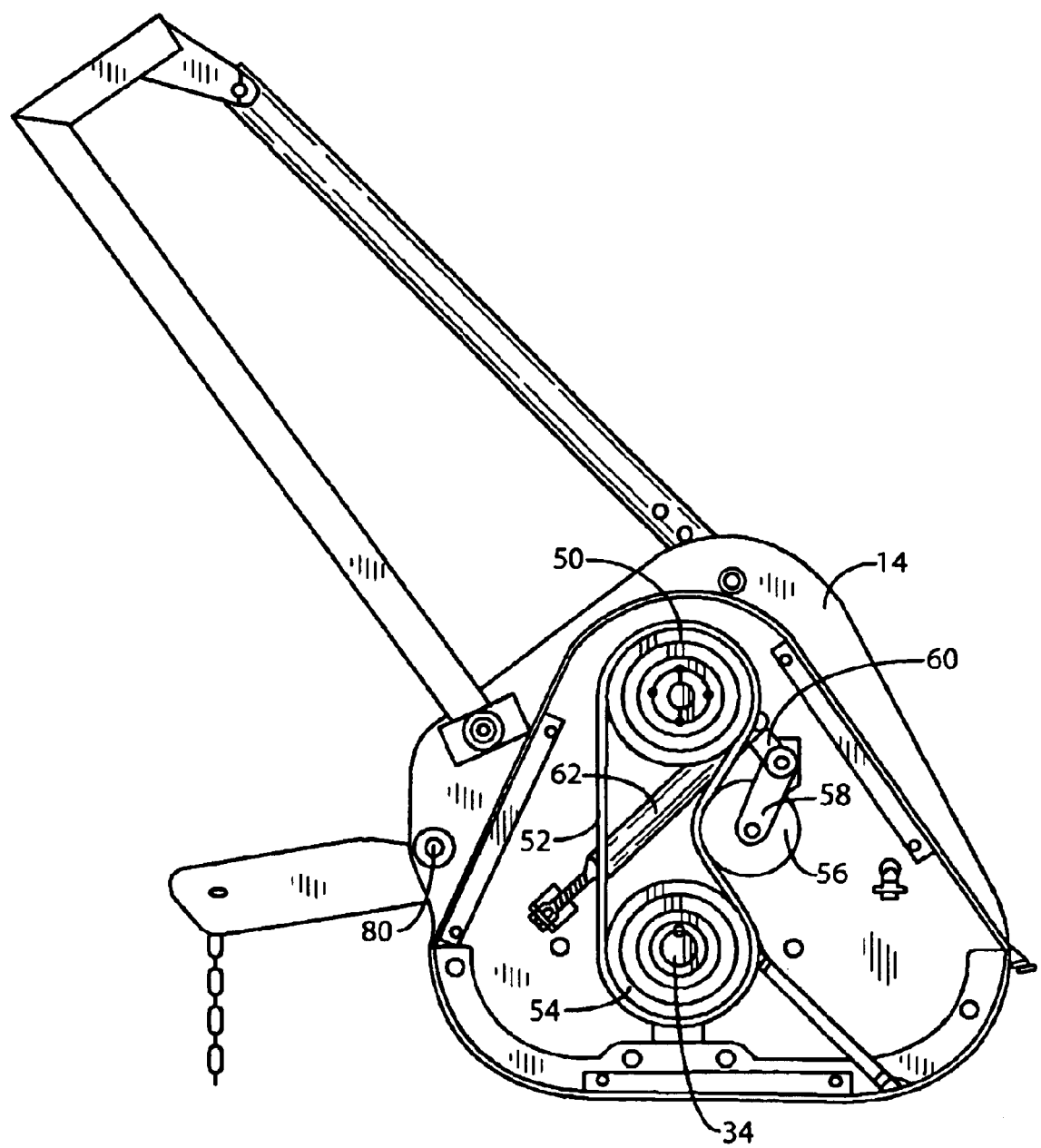
FIG. 3 is a left side cross-sectional view of the present invention.

FIG. 3 is a left side view of the tree cutting attachment, as seen when the pulley cover 18 is removed from left side panel 14 to expose the internal components. The internal components are the parts which transfer power to the rotor cutting assembly 20. More specifically, a drive pulley 50 is located near the top of left side panel 14. It is mounted on the shaft of a hydraulic motor (not shown) bolted to the opposite side of the panel 14. The hydraulic motor 51 is driven from a hydraulic pump (not shown) coupled to the power take off of the self-propelled work vehicle to which the tree/brush cutting is being connected. The drive pulley 50 rotates a belt 52 wrapped around the cutter shaft pulley 54. The cutter shaft pulley 54 is located directly below drive pulley 50 near the bottom of left side panel 14. Drive pulley 50 when driven by the hydraulic motor places a large torque upon rotor shaft 34 to which the drive pulley 54 is keyed. The torque driven rotor shaft 34 causes the rotor assembly 20 with its cutting knives to be rotated in the frame. The rotor assembly 20 will be discussed in greater detail below.

The belt 52 transfers power from the hydraulic motor to the rotor assembly and is made of a cord reinforced elastomeric material. It is tightly engaged against the two pulleys 50 and 54 because of a tensioning pulley 56. This pulley 56 acts as a belt tightener and prevents belt slippage that would adversely affect the amount of torque placed upon drive pulley 54. The belt tensioning pulley 56 pivotally attaches to a bracket 58 which then pivotally mounts to another link segment 60. The link segment 60 is attached to a tube and threaded rod tightening component 62. The bolt on component 62 can be adjusted to either tighten or loosen the belt engagement around the pulleys.

Figure 4:
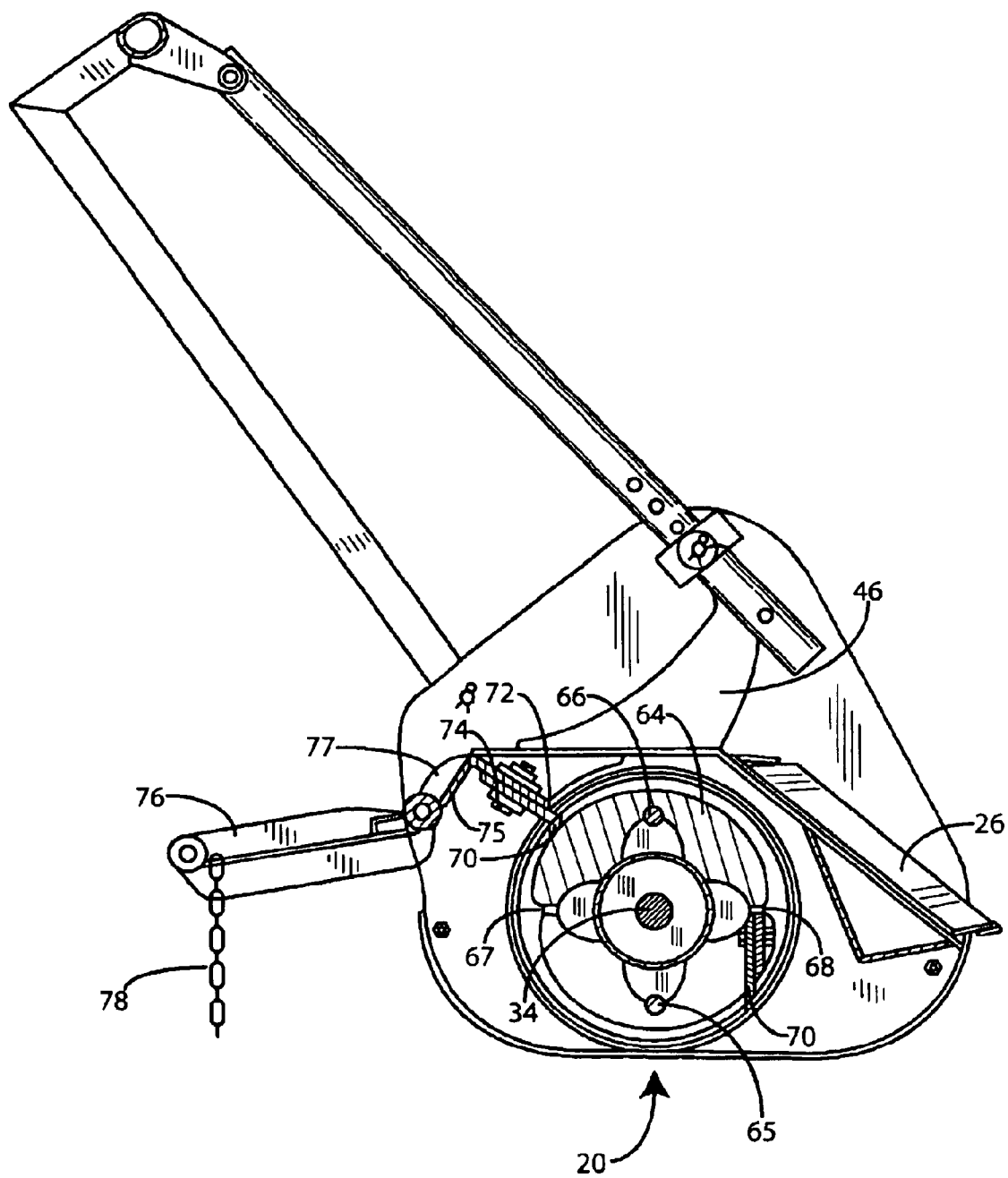
FIG. 4 is a further cross-sectional view of the present invention taken through the rotor.

Referring now to FIG. 4, another cross-section of the tree cutting attachment is shown. The backside of the quick-attachment mount 26 is adapted to engage with the arms of a skid loader vehicle. The rotor assembly 20 is journaled for rotation in bearings 29 set n the side plates 14 and 16. This assembly is made up of a generally cylindrical framework of metal bars, spacer plates and knives. At the center of this framework is the rotor shaft 34. Surrounding the shaft is a series of disc-like spacer plates 64, held in parallel relation by four metal bars, equally spaced around the disc perimeter and to which the spacer plates 64 are welded. Two of the metal bars 65 and 66 are of a circular cross-section and rod-like, and two of the bars 67 and 68 have a rectangular cross-section. The circular rods 65 and 66 are located opposite one another and help to provide stability and rigidity to the assembly. The rectangular bars 67 and 68 also provide stability and additionally form back-up plates for the knife blades 70 that are mounted diametrically around the periphery of the assembly. Trees and brush enter the rotor assembly from the left in FIG. 4 and then are shaved down to small pieces by the spinning action of the cutting blades. The rotor assembly will be discussed further with the aid of FIG. 5. Positioned adjacent the perimeter of the rotor assembly is a adjustable shear bar 72. This adjustable shear bar 72 acts as an anvil controls the depth of cut and the size of the wood chips produced as the rotor assembly is driven. The distance between the tips of the rotating knives 70 and the tip of shear bar 72 govern the chip size, which can be varied by setting the adjustable shear bar 72. A bolt 74 passes through a slotted aperture in the angle bracket 77. Setting the shear bar 72 to a minimum knife clearance reduces feed rate, particle size, and horsepower required. Setting the shear bar 72 to the maximum knife clearance increases the feed rate, particle size and horsepower required.

In FIG. 4, trees and brush enter the assembly from the left side and are shaved down as they move to the right. The panel projecting out from the front of the assembly serves as a brush deflector 76 to the shaved chips. A plurality of short, closely-spaced, individual lengths of chain 78 hang down in a line from the brush deflector 76. The brush deflector 76 and the hanging chains 78 serve to stop chips from projecting out of the device at high velocity when it is in operation.

Figure 5:
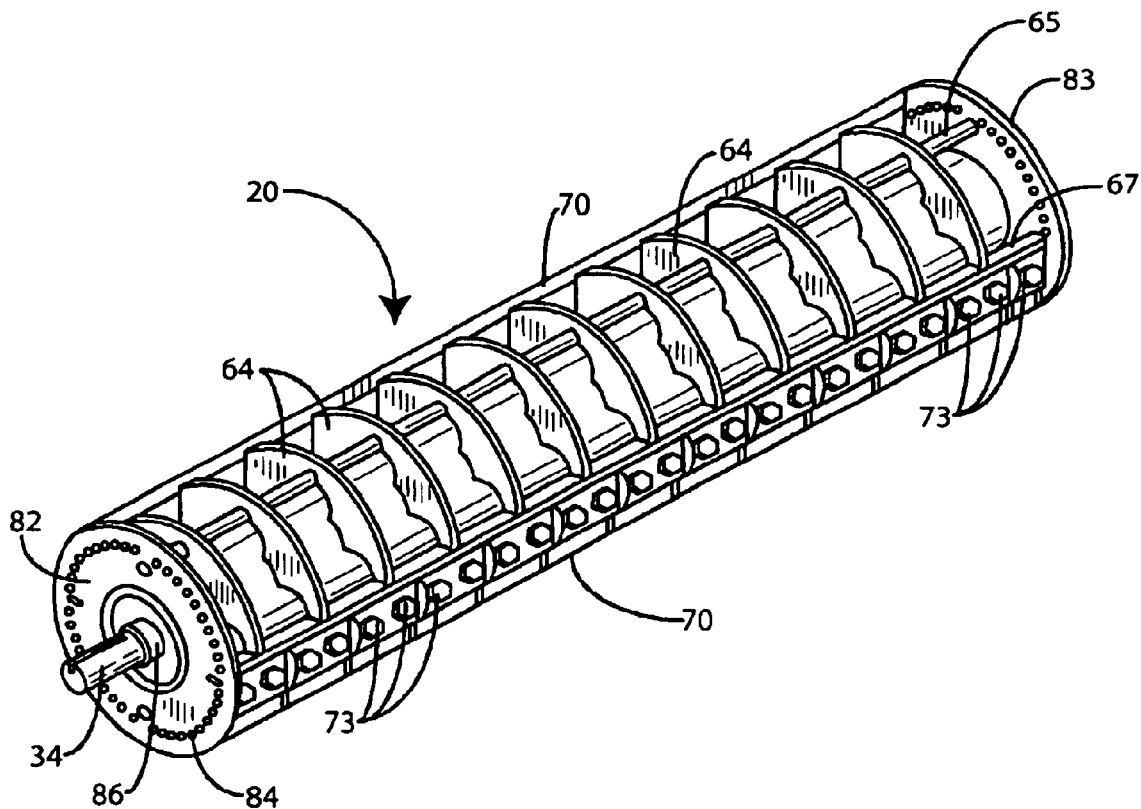
FIG. 5 is a perspective view of the rotor assembly employed in the preferred embodiment.

FIG. 5 is a detail view of the rotor assembly 20 of the present invention removed from its housing 12. The rotor components are mounted and rotate with driven rotor shaft 34. As mentioned, this driven shaft is journaled by bearings affixed to side plates 14 and 16. Along the length of the shaft is a plurality of regularly spaced disc components 64. These disk components are axially spaced on the shaft 34 and provide the assembly with a caged, generally cylinder-like shape. Around the periphery of these discs are the four rods 65, 66, 67, 68 holding the discs 64 in place, as discussed earlier with reference to FIG. 4. Extending tangentially from the periphery of the discs 64 are knife blades 70. The knife blades 70 comprise short, generally rectangular metal plates of tool steel only a few inches in width. They are bolted on diametrically opposite sides of the rotor assembly so as to provide proper balance. These blades are placed in the pockets in between the discs 64 such that the non-cutting end of the blades abut up against the rectangular bar shaped rods 67 or 68. Because of the structural rigidity of the blades mounted in pockets and abutting against the rectangular rods, severe impact forces seen by the knife mounting bolts 73 are absorbed, reducing the chance of shearing of the retaining bolts.

Another important feature of the tree cutting attachment of the present invention includes the way that the leading edge of angle bar 77 keeps uncut material from being propelled up and forward, away from the knives. Maintaining contact with the knives helps to continue the feed of new wood material to the knives. The flat, back side of the "L" shaped angle bar 77 helps control overfeeding caused by uncut material being pulled in at an uncontrolled rate as in the case of the tapered or wedge shaped chamber present in prior art designs, thereby reducing horsepower requirements.

Both the rectangular bar shaped rods 67 and 68 and the cylindrical rods 65 and 66 mount in the two circular end plates 82 and 83. There is a grouping of holes 84 around the outside perimeter of these circular end plates for attachment of balancing weights if required to inhibit vibration of the cutter rotor assembly. The center holes 86 of the end plates 82 and 83 enable the rotor shaft 34 to extend through the end plates.

The operation of the tree cutting attachment for a skid loader is as follows. First, the tree cutting attachment is mounted to a skid loader utilizing the conventional skid loader mount 26. The operator of the skid loader turns on the hydraulic motor 51 coupled to the work vehicle's hydraulic pump causing the drive pulley to rotate. A belt transfers power from the drive pulley 50 to the shaft pulley 54 and, in turn, rotates the rotor assembly 20 with its knives 70 in the direction opposite that of ground travel at about 1700 rpm. Because the rotor 20 is made to rotate in a direction so that its bottom is moving in a direction opposite to the ground travel of the skid loader, the rotating blades tend to lift the downed tree from the ground, facilitating the shreading action.

When the tree cutting attachment is lowered and is driven into brush, the brush deflector 76 is adjusted by tilting the arms of the skid loader to a position where the structure and chains are able to deflect stones and other debris downward. When the material comes into contact with the brush, it is lifted upward and cut by the rotating knives. The cut residue is then discharged over the top of the rotor and out the back of the assembly.

When cutting down a tress, the operator elevates the arms of the skid loader to lift the attachment 10 to a desired height. As the rotor 20 is driven, the two rows of blades 70 shave through the trunk of the tree as the pusher 24 applies a force to the tree trunk above the level it is being cut so as to cause it to fall forward as the trunk is ultimately shoved to the breaking point. Once felled, the operator may operate the skid loader so as to run the rotor mounted blades back and forth over the trunk until it is reduced to chips or shavings which more readily decompose.

This invention has been defined herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself For example, rather than driving the rotor 20 with a hydraulic motor, it may also be mechanically coupled directly to a power take off of the self-propelled work vehicle to which the tree/brush cutter is connected.

What is claimed is:

1. A tree cutting attachment for a self-propelled work vehicle comprising, in combination:
   (a) a frame adapted to be coupled to a work vehicle;
   (b) a rotor assembly journaled for rotation within said frame, the rotor assembly including a central driven shaft having a circular end plate proximate opposed ends thereof and a plurality of intermediate, regularly spaced support plates, the support plates held in parallel spaced relation by a plurality of equally circumferentially spaced bars extending between the end plates;
   (c) first and second pluralities of generally rectangular cutting blades, each having a generally flat rear edge and a sharpened front edge, said cutting blades being mounted in adjacent, side-by-side relation with the generally flat rear edges of the first plurality of blades in abutting relation to a first of the plurality of bars and the generally flat rear edges of the second plurality of blades in abutting relation to a second of the plurality of bars;
   (d) a drive means coupled in driving relation to the driven shaft of the rotor assembly and adapted to rotate the rotor assembly in a direction tending to lift a downed tree from the ground; and
   (e) a shear bar affixed to said frame and extending parallel to the rotor assembly proximate a periphery of the rotor assembly, the shear bar being adjustable relative to the sharpened front edge of the cutting blades whereby a gap between the cutting edge of the blade and the shear bar can be adjusted.

2. The tree cutting attachment as in claim 1 wherein the first and second of the plurality of bars are located on the rotor assembly diametrically opposite one another and the first and second of the plurality of blades extend in a direction generally tangent to a periphery of the rotor assembly.

3. The tree cutting attachment as in claim 2 and further including a plurality of blade supports affixed to the first and second plurality of bars and disposed to adjacent ones of said plurality of support plates, said blades being attachable to individual ones of said plurality of blade supports.

4. The tree cutting apparatus as in claim 1 and further including a debris deflector affixed to the frame.

5. The tree cutting apparatus as in claim 1 wherein the drive means comprises a hydraulic motor.

6. The tree cutting apparatus as in claim 1 wherein the rotor assembly is adapted to be mechanically coupled to a power take-off of the self-propelled work vehicle.

7. A tree cutting attachment for a self-propelled work vehicle comprising, in combination:
   (a) a frame adapted to be coupled to a work vehicle;
   (b) a rotor assembly journaled for rotation within said frame, the rotor assembly including a central driven shaft having a circular end plate proximate opposed ends thereof and a plurality of intermediate, regularly spaced support plates, the support plates held in parallel spaced relation by a plurality of equally circumferentially spaced bars extending between the end plates;
   (c) a plurality of generally rectangular cutting blades, each having a
   sharpened front edge, said cutting blades each being mounted between an adjacent pair of said support plates in adjacent, side-by-side relation, said support plates supporting the first and second plurality of blades against movement upon impact of the sharpened front edges of the cutting blades with wood of a tree being cut;
   (d) a drive means coupled in driving relation to the driven shaft of the rotor assembly and adapted to rotate the rotor assembly in a direction tending to lift a downed tree from the ground; and
   (e) the tree cutting attachment further including a shear bar affixed to said frame and extending parallel to the rotor assembly proximate a periphery of the rotor assembly, the shear bar being adjustable relative to the sharpened front edge of the cutting blades whereby a gap between the cutting edge of the blade and the shear bar can be adjusted.

8. The tree cutting attachment as in claim 7 wherein the plurality of blades extend in a direction generally tangent to a periphery of the rotor assembly.

9. The tree cutting attachment as in claim 8 and further including a plurality of blade supports affixed to the first and second plurality of bars and disposed to adjacent ones of said plurality of support plates, said blades being attachable to individual ones of said plurality of blade supports.

10. The tree cutting apparatus as in claim 7 and further including a debris deflector affixed to the frame.

11. The tree cutting apparatus as in claim 10 wherein the debris deflector comprises a plurality of chain segments suspended at one end from a transversely extending member.

12. The tree cutting apparatus as in claim 7 and further including a pusher assembly affixed to the frame and extending forward thereof for applying a force to a tree trunk being severed by the cutting blades on the rotor assembly to give a preferential direction to a tree being felled.

13. The tree cutting apparatus as in claim 7 wherein the drive means comprises a hydraulic motor.

14. The tree cutting apparatus as in claim 7 wherein the rotor assembly is adapted to be mechanically coupled to a power take-off of the self-propelled work vehicle.

* * * * *